United States Patent [19]
Crosby et al.

[11] Patent Number: 4,876,713
[45] Date of Patent: Oct. 24, 1989

[54] SIGNAL CIRCUIT PROTECTOR DEVICE FOR CONSUMER USE

[75] Inventors: John J. Crosby, Gorham; John J. Napiorkowski, Cape Elizabeth, both of Me.

[73] Assignee: GTE Products Corporation, Stamford, Conn.

[21] Appl. No.: 213,950

[22] Filed: May 31, 1988

[51] Int. Cl.$^4$ .............................................. H04M 1/74
[52] U.S. Cl. ................................... 379/412; 361/119; 361/56
[58] Field of Search ................ 379/412, 387; 361/119, 361/56, 111, 55, 118, 120, 110, 54

[56] References Cited
U.S. PATENT DOCUMENTS

| | | | |
|---|---|---|---|
| 4,438,477 | 3/1984 | Cawley | 379/412 X |
| 4,477,857 | 10/1984 | Crocker | 379/412 X |
| 4,584,622 | 4/1986 | Crosby et al. | 361/111 X |
| 4,695,916 | 9/1987 | Satoh et al. | 361/56 |

Primary Examiner—James L. Dwyer
Attorney, Agent, or Firm—James Theodosopoulos

[57] ABSTRACT

A solid state protector device is disclosed for protecting a consumer's solid state electronic circuits from abnormal voltage and current surges. The device comprises an enclosure made of electrically non-conductive material having front, rear, side, top and bottom walls. A protector circuit is disposed in the enclosure for protecting electronic equipment from abnormal current and voltage surges. The protective circuit has an input terminal, an output terminal and a ground terminal. An input connector for receiving an input circuit signal is disposed in the front wall of said enclosure and electrically connected to the input terminal of said protector circuit. An output connector for conducting said circuit signal to the electronic equipment to be protected is disposed in the front wall of said enclosure and electrically connected to the output terminal of said protector circuit. A plug is used for connection to an outside ground and is disposed in the rear wall of said enclosure.

4 Claims, 4 Drawing Sheets

SIGNAL CIRCUIT PROTECTOR DEVICE FOR CONSUMER USE

FIELD OF THE INVENTION

The present invention relates to the field of telephony, and more particularly to a new and improved solid state protector device for protecting the consumer's solid state electronic circuits of telephone or other signal circuit equipment and the like from abnormal voltage and current surges, spikes, and transients.

BACKGROUND OF THE INVENTION

Electronic circuits using small signal transistors and integrated circuits are easily damaged by high voltage transients that may appear on the line due to lightning, switching transients, or power line induction. Accordingly, some form of transient and over voltage protection must be used to protect the solid state circuits, for example, in the electronic telephone sets (telephone station) and related equipment.

Since technology used for making integrated circuits cannot provide high enough breakdown voltage, other devices are employed. For example, one or more external zener diodes are placed across the line to provide over voltage protection. When the input voltage exceeds the zener (breakdown) voltage, the zener conducts and holds the voltage input to the electronic circuit at the rated zener voltage.

Another type of protector circuit is disclosed in the copending application of Shannon et al entitled Compact Solid State Protector Device, Ser. No. 082,625, filed Aug. 7, 1987. Briefly, as described therein, the protector circuit comprises two bidirectional solid state voltage sensitive switch devices with an associated ground terminal, two variable resistance devices, and line protector means for protecting the solid state protector device from high voltage transients and abnormal currents. The disclosed protector circuit provides protection of electronic equipment from voltage surges by electronically switching the voltage surge from line to ground. Additionally, the protector circuit protects the electronic equipment and itself from high current surges on the line by increasing the impedance of the line thereby reducing the current to the equipment to the desired value. Upon cessation of the high voltage or current surge, the activated protector device returns to the inactive or idle state, allowing the line circuit to function in the usual manner.

While such protector circuits provide improvement in the areas intended, there is still a great need to provide a compact enclosure in which the protector circuit can be mounted and which provides for safety requirements and minimizes space while accepting standard line connectors and providing standard mounting plug-in connectors.

Accordingly, a principal object of the present invention is to provide a solid state protector device for use as a consumer circuit protector for solid state telephone and related equipment.

Another object of the present invention is to provide a solid state protector device which is constructed and arranged to be mounted in standard jacks and to receive standard connectors at the customer's premises.

SUMMARY OF THE INVENTION

The present invention discloses a solid state protector device which protects the consumer's electronic equipment circuits from high voltage transients and abnormal currents which would damage such electronic circuits.

Briefly stated, the present invention provides for a solid state circuit protector device comprising an enclosure made of electrically non-conductive material. Mounted within the enclosure is a solid state protector circuit which comprises two bidirectional solid state voltage sensitive switch devices (VSS) with an associated ground terminal, two variable resistance devices, and line protector fuse means for protecting the solid state protector circuit from high voltage transients and abnormal currents. The protector circuit is mounted on a circuit board which is disposed within the enclosure. In one embodiment, the circuit board divides the enclosure into first and second chambers. The first chamber contains a protector module containing the voltage sensitive switch devices and the variable resistance devices while the second chamber contains the input output connector line, protector fuse means and ground terminal and plug. In another embodiment, the protector circuit is mounted on a circuit board disposed within one portion of the enclosure together with associated input output connectors. Disposed within another portion of the enclosure is an AC voltage surge protector circuit mounted upon a circuit board together with associated circuit connectors and power switches. A suitable type of the AC transient voltage surge suppressor is disclosed in the U.S. Pat. No. 4,584,622. The present invention provides for a new and improved protector device for protecting electronic equipment circuits.

BRIEF DESCRIPTION OF THE DRAWINGS

For a fuller understanding of the nature and desired objects of the invention, reference should be had to the following detailed description taken in connection with the accompanying drawings wherein like reference characters denote corresponding parts througout the several views and wherein.

Detailed Description of the Preferred Embodiments

Figure 1:
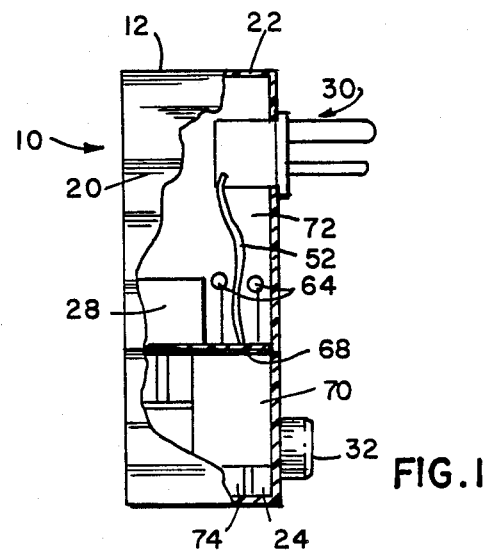
FIG. 1 is a fragmentary view of the protector device of the protector device in accordance with the present invention.
Figure 2:
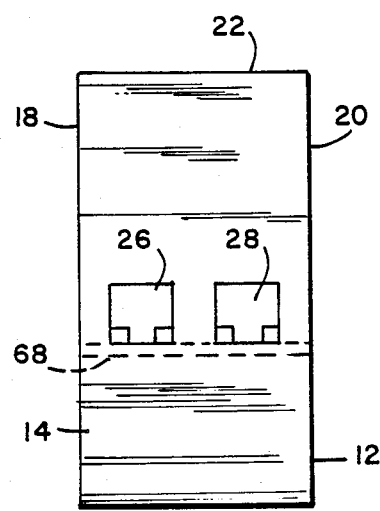
FIG. 2 is a front plan view of the protector device of FIG. 1.
Figure 3:
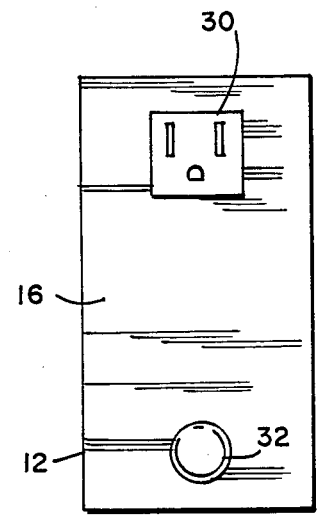
FIG. 3 is a rear plan view of the protector device of FIG. 1.

Referring now to FIGS. 1 through 4 of the drawings, there is illustrated generally at 10 one embodiment of the protector device in accordance with the present invention. The device 10 comprises an enclosure 12 formed of an electrically nonconductive material. The enclosure is preferably formed from a suitable plastic material such as ABS Cycolac KJB manufactured by the Borg-Waner Corp., and includes a front wall 14, rear wall 16, side walls 18 and 20, top wall 22 and bottom wall 24. Disposed in the front wall 14 is an input connector 26 for receiving an input signal from an input plug (not shown) and output connector 28 for conducting the circuit signal via an insert plug (not shown) to the electronic equipment circuit to be protected. Disposed in the rear wall 16 is plug 30 providing the ground connection. Also disposed in the rear wall 16 is a bumper means 32 which serves in cooperation with plug 30 to maintain the protector device 1 in spaced relationship from a supporting structure (not shown) such as, for example, the wall containing the ground receptacle for receiving plug 30.

Figure 4:
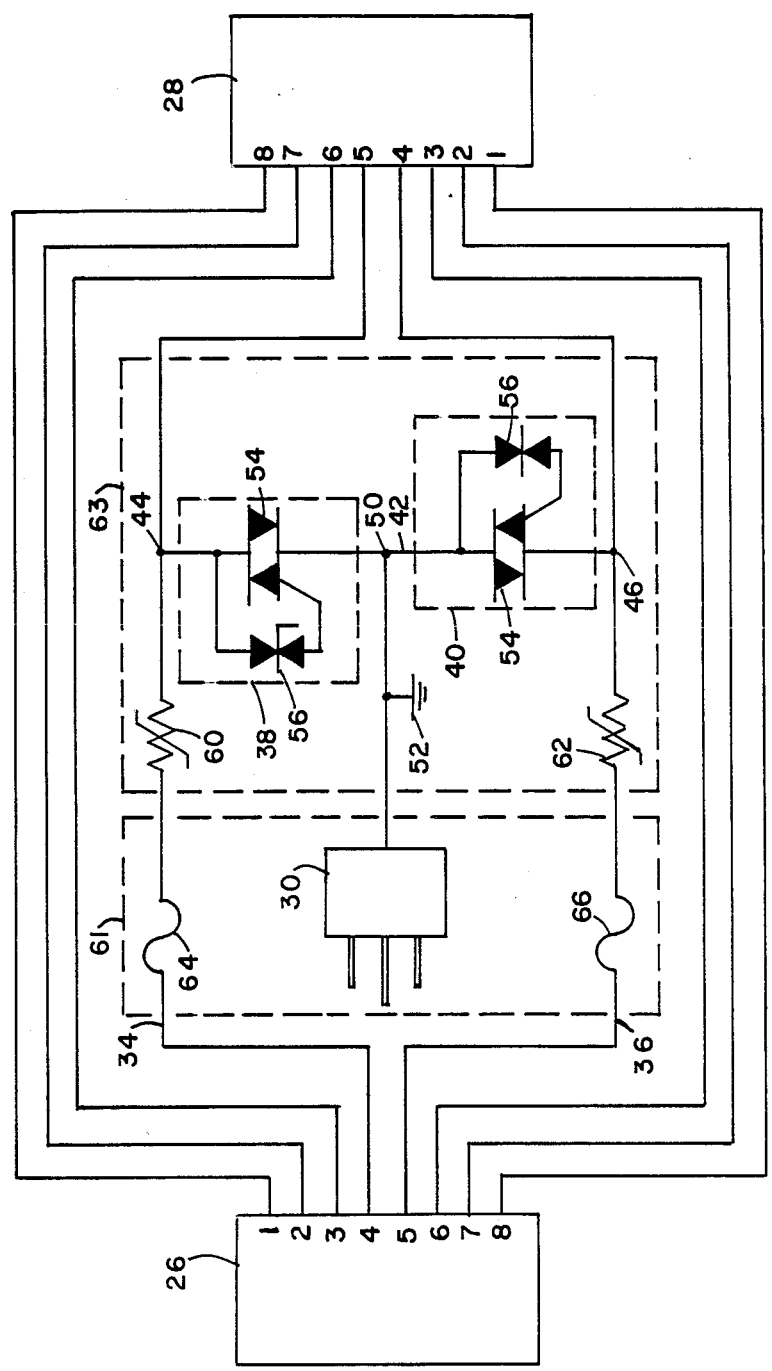
FIG. 4 is a schematic diagram of one embodiment of a protector circuit employed in the protector device of FIG. 1.

Referring now more particularly to FIG. 4, there is illustrated an enlarged schematic diagram of an embodiment of the protector circuit as employed in the protector device of the present invention as illustrated in FIG. 1. For simplicity of discussion only, the input lines 34 and 36 (represented as lines 4 and 5 at connectors 26 and 28) will be described although other lines 1, 2, 3, 6, 7 and 8, for example, may be employed for other purposes. As illustrated, the signal protector circuit comprises two bidirectional solid state voltage sensitive switch means (VSS) 38 and 40 connected on conductor 42 which is connected across conductors 34 and 36 at contact points 44 and 46. Connected at contact point 50 on conductor 42 between switches 38 and 40 is a common ground 52 which is connected to ground plug 30. The bidirectional or bilateral voltage sensitive switch means (VSS) 38 and 40 each comprises a gated triac 54 and a pair of zener diodes 56 connected to the gates of the triacs and to points 44 and 46.

As is known, the triac is equivalent to two silicon controlled rectifiers (SCRS) connected in parallel whereby the triac can switch both direct and alternating current. The protector circuit further includes a variable resistance means 60 and 62 which are connected in series with conductors 34 and 36 respectively before the voltage sensitive switch means 38 and 40. The variable resistance 60 and 62 are preferably positive temperature coefficient resistance devices (PTC) which vary their resistance in direct proportion to the applied current. Suitable PTC devices can be the semiconductor ceramic discs having metal electrodes on both faces. One suitable PTC device is P070E40A25-75B0056, manufactured by GTE Products Corp. Suitable VSS devices can be, for example, the VSS device by RCA under the name "Surgector".

The protector circuit also includes a fail-safe portion 61 (shown by dotted lines) which comprises a pair of current limiting means such as fuse elements 64 and 66 connected respectively to conductors 34 and 36 which protect circuit portion 63 (shown by the dotted lines) and the user's equipment (not shown) from severe abnormal electrical disturbances.

In operation, still referring to FIG. 4, during normal current flow, the current flows from the input connector 26 to the output connector 28 and to the electronic equipment to be protected with substantially no current flowing through the bidirectional voltage sensitive switch means 38 or 40 due to the selected high impedance level of the bidirectional switch means 38 and 40. Therefore, the current signal flows through the conductors 34 and 36 to the electronic equipment at the predetermined normal values of current and voltage. When a voltage surge occurs which is greater than the selected breakdown voltage of the diode 56, the diode 56 conducts to bias the bidirectional switch 54 which is then "turned on" and conducts current thereby shunting the line current to ground 52. Shunting of the current to ground 52 simultaneously increases the resistance of the variable resistance means 60 and 62 thereby increasing the voltage drop across the variable resistance and reducing the voltage surge to normal operating values to protect the electronic equipment.

When the variable resistance means 60 and 62 are positive temperature coefficient resistance devices (PTC), they act as variable resistors. When a voltage surge occurs, the increased power heats the PTCs, thereby increasing the resistance and the voltage drop across the PTCs.

When the current or voltage surge decreases below a selected value of the diode 56, the voltage across the diode is not sufficient for conduction with the result that the current to the bidirectional switch 54 is terminated and the switch is "turned off" and no longer conducts to shunt the current from the line. The operation then returns to normal.

Additionally, when an abnormally high current or voltage surgeoccurs, the fail-safe portion 61 of the circuit disconnects the portion 63 when values of the fuses 64 and 66 are exceeded.

Referring again to FIGS. 1 through 4 and especially to FIG. 1, the mounting of the protector circuit within the enclosure is illustrated. As shown, a circuit board 68 such as a PC board is disposed within enclosure 12 and is operable to receive on the lower side the protective module 70 which contains the portion 63 of the protective circuit, and on the upper side, to receive portion 61 of the protective circuit comprising the fuses 64, 66, ground 52 and ground plug 30. Input and output connectors 26 and 28 are also electrically connected to the upper side of the PC board 68. In this manner, the PC board 68 divides the enclosure 12 into an upper chamber 72 and a lower chamber 74.

Figure 5:
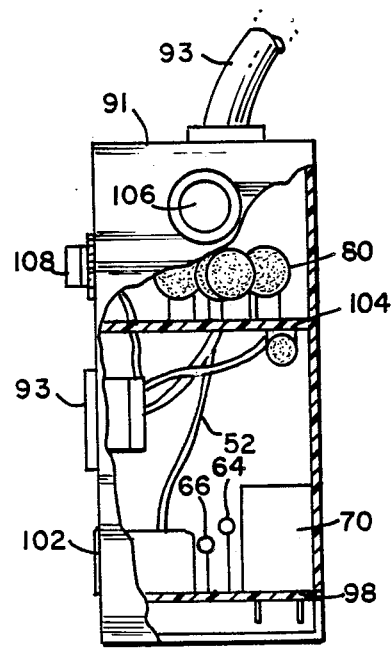
FIG. 5 is a fragmentary side view of an alternate embodiment of the protector device in accordance with the present invention including an AC transient voltage surge protector circuit.
Figure 6:
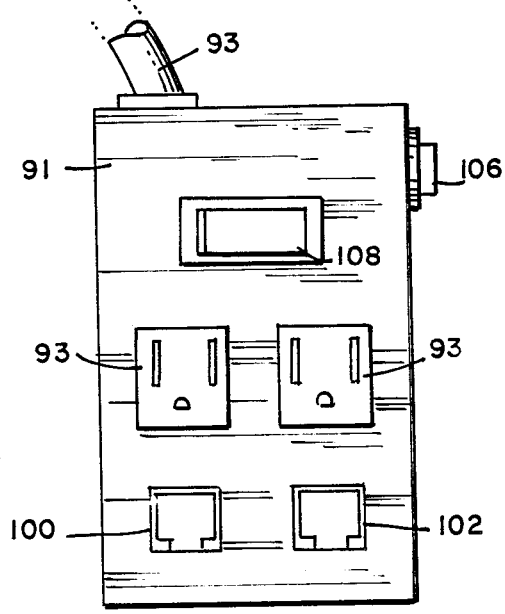
FIG. 6 is a front plan view of the protector device of FIG. 5.
Figure 7:
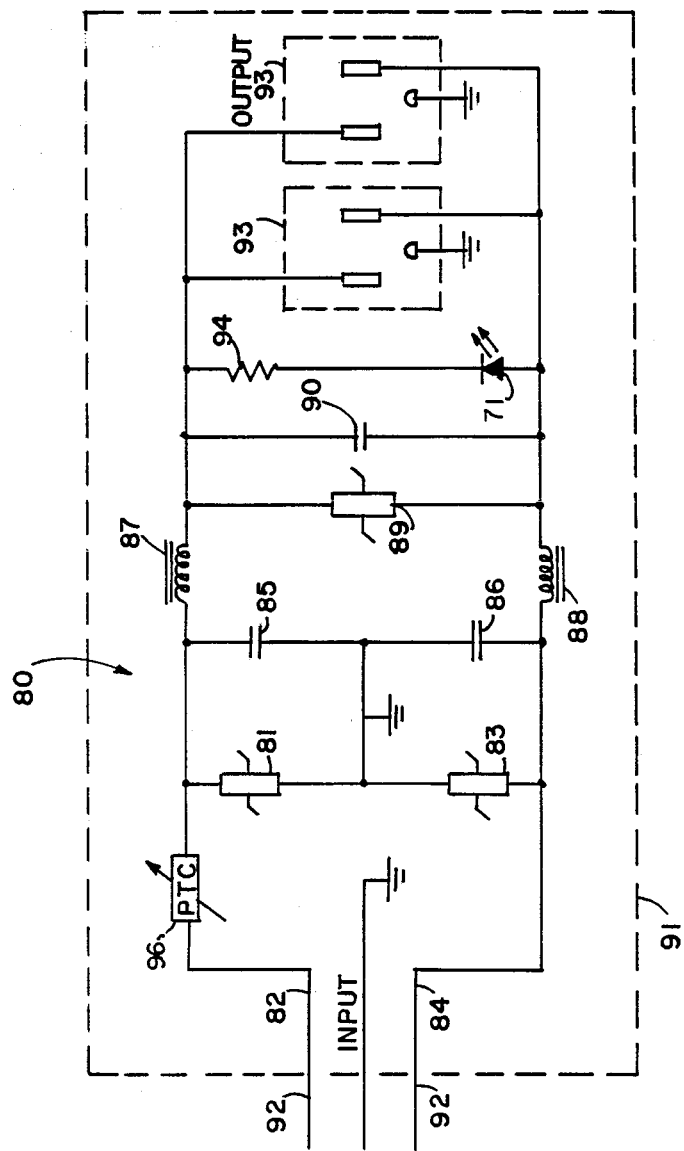
FIG. 7 is a schematic diagram of the one embodiment of an AC transient voltage surge protector circuit employed in the protector device of FIG. 5.

Referring now to FIGS. 5 through 7, there is illustrated an alternate embodiment of the protector device of the present invention further employing an A.C. transient voltage surge protector or suppressor. Referring now especially to FIG. 7, there is illustrated a suppressor circuit shown generally at 80 which comprises two metal oxide varistors at the input end of the circuit, varistor 81 between line 82 and ground, and varistor 83 between neutral 84 and ground. Varistors 81 and 83 suppress any incoming voltage surges referenced from line 82 to ground or from neutral 84 to ground, respectively, by reducing impedance and maintaining an established clamping voltage across each varistor. This arrangement also will limit incoming surges referenced from line 82 to neutral 84 to approximately the sum of the rated clamping voltages of varistors 81 and 83, thus acting as a first stage of transient voltage suppression.

In parallel with varistors 81 and 83 respectively, are capacitors 85 and 86 which are followed by two choke coils, choke 87 in series with line 82, and choke 88 in series with neutral 84. Following chokes 87 and 88 are varistor 89 connected between line 82 and neutral 84, and capacitor 90, in parallel with varistor 89.

Capacitors 85, 86 and 90 along with chokes 87 and 88 form a low pass filter for suppression of radio frequency interference/electromagnetic interference (RFI/EMI) which might interfere with the operation of electronic equipment. This low pass filter also will slow the rise time of an incoming fast rising surge, allowing varistor 89 to respond and suppress the surge voltage before a damaging voltage is present at the output. Varistor 89 acts as a second stage of voltage surge suppression, limiting any surge to the clamping voltage of varistor 89. Thus, any excessive voltage presented at the input of the circuit will be limited to the varistor clamping voltage at the output within a short enough period of time to protect electronic equipment connected to the output.

The suppressor circuit 80 is contained within enclosure 91 as discussed hereinafter and is provided with terminals 92 for connection to the usual 120 volt electrical source, and having receptacles 93 for connection to electronic equipment also as discussed hereinafter. It may be desirable to place one or more PTC protectors 96 in series with the voltage limiting devices in order to provide protection against a long duration surge. PTC protector 96 limits current by increasing its resistance with an increase in its temperature.

It may also be desirable to place a resistor 94 and light emitting diode 95 (LED) in the circuit to indicate the presence of voltage at the output. In the event of an open fuse or tripped circuit breaker in the electrical supply to the input, the LED would be extinguished.

Referring now more especially to FIGS. 5 and 6, the alternate embodiment of the protective device is illustrated. The enclosure 91 is similar to the enclosure 12 of FIG. 1. As illustrated, the protector circuit described with respect to FIG. 4 is disposed upon circuit board 98 which is disposed in the lower portion of the enclosure. Circuit connectors 100 and 102 are also disposed upon circuit board 98 in the same manner as described with respect to connectors 26 and 28. The A.C. suppressor circuit 80 is disposed upon circuit board 104 which is disposed in the upper portion of enclosure 91. The input terminals 92 are connected to the power source 71 through circuit breaker 106 and power switch 108. As can be seen, the embodiment of FIGS. 5 through 7 provides the protector device of FIGS. 1 through 4 in addition to the AC transient voltage surge suppressor each of which share the same ground connection.

While the invention has been described with respect to preferred embodiments, it will be apparent to those skilled it the art that changes and modifications may be made without departing from the scope of the invention herein involved in its broader aspects. Accordingly, it is intended that all matter contained in the above description, or shown in the accompanying drawing shall be interpreted as illustrative and not in a limiting sense.

As our invention, we claim:

1. A solid state protector device for protecting a consumer's solid state electronic telephone equipment from abnormal voltage and current surges comprising:
   an enclosure made of electrically non-conductive material having front, rear, side, top and botton walls;
   a protector circuit means for protecting electronic equipment from abnormal current and voltage surges comprising first and second circuit portions;
   said first protector circuit portion comprising:
   a pair of input terminals;
   a pair of output terminals for connection across the electronic equipment;
   a voltage sensitive switch means connected across said output terminals;
   a variable resistance means connected in series with said electronic equipment between one of the input terminals and one of the output terminals before said voltage sensitive switch means; and
   a ground means connected in series with said voltage sensitive switch means between said output terminals;
   said second protector circuit portion comprising:
   resistance means connected in series with said electronic equipment between said input terminals and the output terminals before said voltage sensitive switch means:
   a printed circuit board means disposed within said enclosure and dividing said enclosure into first and second chambers;
   said first protector circuit portion being disposed in said first chamber and said second protector circuit portion being disposed in said second chamber portion;
   said printed circuit board means being operable to electrically connect said first and second protector crcuit portions and to provide access to said input and output terminals and said ground means within said second chamber;
   an input connector for receiving an input circuit signal disposed in the front wall of said second chamber and electrically connected to the input terminal of said protector circuit;
   an output connector for conducting said signal circuit to the electronic equipment to be protected disposed in the front wall of said chamber and electrically connected to the output terminal of said protector circuit; and
   a plug means for connection to an outside ground means disposed in the rear wall of said second chamber and electrically connected to said ground means.

2. The solid state protector device of claim 1 wherein the first protector circuit portion further comprises:
   a second voltage sensitive switch means connecting in series across said output terminals;
   a second variable resistance means connected in series with said electronic equipment between the other input terminal and the other output terminals before each of said voltage sensitive switch means; and
   fuse means connected in series with the line before said variable resistance switch means.

3. The solid state protector device according to claim 1 including a voltage surge suppressor circuit for AC power lines for suppression of RFI and EMI, said suppressor circuit having input terminals for connection to an AC power source, output terminals for connection to the output terminals connected to the electronic telephone equipment, and ground means.

4. The solid state protector device of claim 3 wherein the voltage surge suppressor circuit for AC power lines for suppression of RFI and EMI is mounted upon a circuit board within said enclosure and comprises:
   an input consisting of a line, a neutral and a second ground;
   a first varistor connected between the line and ground;
   a second varistor connected between the neutral and the ground;
   a first capacitor in parallel with the first varistor;
   a second capacitor in parallel with the second varistor;
   a first choke connected in series with the line after the first varistor and first capacitor;
   a second choke connected in series with the neutral after the second varistor and second capacitor;
   a third varistor connected between the line and neutral after the two chokes;
   a third capacitor in parallel with the third varistor and an output for connection to said electronic telephone equipment.

* * * * *